(12) United States Patent
Renault

(10) Patent No.: US 12,196,286 B2
(45) Date of Patent: Jan. 14, 2025

(54) PENDULUM DAMPING DEVICE

(71) Applicant: VALEO EMBRAYAGES, Amiens (FR)

(72) Inventor: Alexandre Renault, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 39 days.

(21) Appl. No.: 17/599,947

(22) PCT Filed: Feb. 28, 2020

(86) PCT No.: PCT/EP2020/055354
§ 371 (c)(1),
(2) Date: Sep. 29, 2021

(87) PCT Pub. No.: WO2020/200601
PCT Pub. Date: Oct. 8, 2020

(65) Prior Publication Data
US 2022/0196113 A1    Jun. 23, 2022

(30) Foreign Application Priority Data
Apr. 3, 2019   (FR) ...................................... 19 03550

(51) Int. Cl.
*F16F 15/14*   (2006.01)
(52) U.S. Cl.
CPC .................. *F16F 15/145* (2013.01)
(58) Field of Classification Search
None
See application file for complete search history.

(56) References Cited

U.S. PATENT DOCUMENTS

| 2017/0114858 A1* | 4/2017 | Horita .................. F16F 15/145 |
| 2018/0231098 A1* | 8/2018 | Güllük .................. F16F 15/145 |
| 2018/0313427 A1 | 11/2018 | Siemens et al. |

FOREIGN PATENT DOCUMENTS

| CN | 103026097 A | 4/2013 |
| CN | 106195115 A | 12/2016 |
| CN | 106461009 A | 2/2017 |
| DE | 10 2008 005 138 A1 | 8/2008 |
| DE | 10 2011 016 568 A1 | 11/2011 |
| DE | 10 2015 220 419 A1 | 4/2017 |

(Continued)

OTHER PUBLICATIONS

International Search Report issued on Jun. 5, 2020 in PCT/EP2020/055354 filed on Feb. 28, 2020, 2 pages.

*Primary Examiner* — Vicky A Johnson
(74) *Attorney, Agent, or Firm* — Oblon, McClelland, Maier & Neustadt, L.L.P.

(57) ABSTRACT

A pendulum damping device includes a support free to rotate about an axis; at least one pendulum body that is able to move relative to the support; and at least one rolling component guiding the movement of the pendulum body relative to the support. The rolling component cooperates with at least one first raceway integral with the support and with at least one second raceway integral with the pendulum body. One from among the first raceway and the second raceway defines an arc of a circle and the other one from among the first raceway and the second raceway defining a form other than an arc of a circle.

15 Claims, 3 Drawing Sheets

(56) References Cited

FOREIGN PATENT DOCUMENTS

| | | | |
|---|---|---|---|
| DE | 10 2016 125 256 A1 | 6/2018 | |
| DE | 10 2017 119 244 A1 | 2/2019 | |
| FR | 3 033 187 A1 | 9/2016 | |
| FR | 3037114 A1 * | 12/2016 | |
| FR | 3048271 A1 * | 9/2017 | ............ F16F 15/145 |
| FR | 3 064 324 A1 | 9/2018 | |
| JP | 2011-99490 A | 5/2011 | |
| JP | 2013-542387 A | 11/2013 | |
| JP | 2015-40631 A | 3/2015 | |
| JP | 2017-15258 A | 1/2017 | |
| WO | WO 2012/079557 A1 | 6/2012 | |
| WO | WO 2016/125382 A1 | 8/2016 | |

* cited by examiner

PENDULUM DAMPING DEVICE

The present invention relates to a pendulum damping device, in particular for a motor vehicle transmission system.

In such an application, the pendulum damping device can be integrated into a torsion damping system of a clutch capable of selectively connecting the combustion engine to the gearbox, in order to filter the vibrations due to the acyclic behavior of the engine. Such a torsion damping system is, for example, a dual mass flywheel.

As a variant, in such an application, the pendulum damping device can be integrated into a friction clutch disk or a hydrodynamic torque converter or a flywheel secured to the crankshaft or a dry or wet dual clutch or a single wet clutch or a hybrid powertrain.

Such a pendulum damping device conventionally implements a support and one or more pendulum bodies that are movable relative to this support, with the movement of each pendulum body relative to the support being guided by two rolling components cooperating, on the one hand, with raceways integral with the support, and, on the other hand, with raceways integral with the pendulum bodies. Each pendulum body comprises, for example, two pendulum masses riveted together.

It is known, for example, from patent EP 2652355, for a pendulum body to be provided, the movement of which relative to the support combines a translation movement about a dummy axis and a rotation movement of the pendulum body on itself, with such a movement of the pendulum body sometimes being called "combined movement". EP 2652355 particularly teaches guiding the movement of the pendulum body by rolling components rolling on free form raceways, without explaining the nature of these free forms.

DE 10 2016 125 256, US 2018/231098 and FR 3033187 disclose pendulum damping devices that do not specify the form of some raceways.

A requirement exists for allowing the pendulum body to have a combined movement using easily produced raceways.

The aim of the invention is to respond to this requirement and it does so, according to one of the aspects thereof, using a pendulum damping device comprising:
  a support free to rotate about an axis;
  at least one pendulum body that is able to move relative to the support; and
  at least one rolling component guiding the movement of the pendulum body relative to the support, with this rolling component cooperating with at least one first raceway integral with the support and with at least one second raceway integral with the pendulum body, with one from among the first raceway and the second raceway defining an arc of a circle and the other one from among the first raceway and the second raceway defining a form other than an arc of a circle.

The invention allows the pendulum body to be moved relative to the support both by translation movement about a dummy axis parallel to the axis of rotation of the support, and also by a rotation movement on itself, in particular by rotating about its center of gravity, using raceways, which are less complex to produce given that one of these raceways defines an arc of a circle.

Within the meaning of the present application:
  "axially" means "parallel to the axis of rotation";
  "radially" means "along a straight line belonging to a plane orthogonal to the axis of rotation and intersecting this axis of rotation";
  "angularly" or "circumferentially" means "about the axis of rotation";
  "orthoradially" means "perpendicular to a radial direction";
  "integral with/secured to" means "rigidly coupled";
  the excitation order of a combustion engine equals the number of explosions of this engine per crankshaft revolution;
  the rest position of a pendulum body is that in which this pendulum body is subject to a centrifugal force without being subject to torsion oscillations that are due to acyclic behavior of the combustion engine. For this rest position, the value of the curvilinear abscissa of the center of gravity of the pendulum body is zero; and
  an order value is filtered by the pendulum damping device when the ratio between: the amplitude of a torsion oscillation to this order value in the presence of the pendulum damping device and this same amplitude in the absence of the pendulum damping device is less than 0.2, in particular less than 0.1.

According to one embodiment of the invention, the second raceway defines an arc of a circle and the first raceway defines a form other than an arc of a circle. However, as a variant, the first raceway defines an arc of a circle and the second raceway defines a form other than an arc of a circle.

The first raceway has a rest point, corresponding to the contact point between the rolling component and this first raceway when the pendulum body is in its rest position, and, when the first raceway defines a form other than an arc of a circle, this first raceway can have a discontinuity in form, which can involve a discontinuity in curvature, at the passage of this rest point. Due to this discontinuity in form, an asymmetry is created in the first raceway.

When the first raceway has a discontinuity in form at the passage of the rest point, the first raceway can define an arc of a circle on one side of the rest point and can define a form different from an arc of a circle on the other side of the rest point. The radius of the arc of a circle defined by the second raceway can be equal to, or greater than, or less than, the radius of the arc of a circle defined by a portion of the first raceway.

In a more precise example, the first raceway defines an arc of a circle on one side of the rest point and it defines a form having a constantly variable curvature on the other side of the rest point, in particular a constantly increasing or constantly decreasing curvature on the other side of this rest point. There is, for example, for the first raceway, an arc of a circle on one side of the rest point and an Archimedean spiral on the other side of the rest point.

Throughout the above, the pendulum damping device can comprise two rolling components guiding the movement of the pendulum body relative to the support, with each rolling component rolling on a first raceway integral with the support and specific to said rolling component and on a second raceway integral with the pendulum body and specific to said rolling component, one of these first raceways can define an arc of a circle from the rest point of this first raceway by moving in the trigonometric direction and can define a form different from an arc of a circle from the rest point by moving in the non-trigonometric direction; and
  the other one of these first raceways can define an arc of a circle from the rest point of this first other raceway by moving in the non-trigonometric direction and can define a form different from an arc of a circle from the rest point by moving in the trigonometric direction.

In other words, in the case of a pendulum body, the movement of which relative to the support is guided by two rolling components, the two first raceways associated with this pendulum body can have inverted forms, with the portions facing these first raceways, also called "proximal portions" hereafter, having the same form, for example, an arc of a circle, respectively, for example, a form different from an arc of a circle, whereas the portions of these first raceways furthest apart from each other, also called "distal portions" hereafter, have the same form, for example, a form different from an arc of a circle, respectively, for example, an arc of a circle.

The two first raceways associated with guiding the movement of the same pendulum body can be symmetrical relative to an axis of symmetry, which can define the axis of symmetry of the pendulum body in its rest position. This axis of symmetry for the two first raceways can extend radially.

The rolling component is able to move along the first raceway between two end positions disposed on either side of the rest point, and the rest point may or may not be disposed at the halfway point of the length of the first raceway, with this length being measured between these two end positions.

Throughout the above, the pendulum damping device can comprise a single support, and the pendulum body can comprise: a first pendulum mass axially disposed on a first side of the support and a second pendulum mass axially disposed on a second side of the support, with the first pendulum mass and the second pendulum mass being secured together by at least one linking component.

According to a first preferred embodiment of a pendulum damping device with a single support, the first and second pendulum masses are rigidly connected together by one or more linking components.

According to this first preferred embodiment, the rolling component can cooperate with a single first raceway and with a single second raceway, and this second raceway is defined by a linking component of the pendulum body. The fact that this second raceway is in the form of an arc of a circle can simplify the manufacture of the part forming the linking component. Assembling the part forming the linking component with the pendulum masses in order to form the pendulum body also can be simpler. A portion of the profile of this linking component defines, for example, the second raceway. As a variant, a coating can be deposited onto this portion of the profile of the linking component in order to form the second raceway. Such a linking component is, for example, force-fitted, via each of its axial ends, into an opening provided in one of the pendulum masses. As a variant, the linking component can be welded or screwed or riveted via its axial ends to each of the first and second pendulum masses.

According to this preferred embodiment, when the movement of each pendulum body relative to the support is guided by at least two rolling components, in particular exactly two rolling components, two linking components can be provided that each cooperate with a rolling component. As a variant, a single linking component can be provided and this single linking component can define two second separate raceways, with one of these second raceways cooperating with one of the rolling components and the other one of these second raceways cooperating with the other one of the rolling components.

Each rolling component then can be only compression loaded between the aforementioned first and second raceways. These first and second raceways cooperating with the same rolling component can be at least partially radially facing each other, i.e. there are planes perpendicular to the axis of rotation in which these raceways both extend.

According to the first preferred embodiment, each rolling component can be accommodated in an aperture of the support already accommodating a linking component and not accommodating any other rolling component. This aperture is defined, for example, by a closed profile, a portion of which defines the first raceway integral with the support that cooperates with this rolling component.

According to a second preferred embodiment of a pendulum damping device with a single support, the pendulum damping device also comprises a pendulum body with a first and a second pendulum mass axially offset and rigidly connected together by one or more linking components, but each rolling component cooperates, on the one hand, with a single first raceway integral with the support and, on the other hand, with two second raceways integral with the pendulum body. Each pendulum mass then has an opening, a portion of the profile of which defines one of these second raceways.

According to this second preferred embodiment, each linking component consolidates, for example, a plurality of rivets and this linking component is accommodated in an aperture of the support, whereas the rolling component is accommodated in an opening of the support separate from an aperture accommodating a linking component. According to this second preferred embodiment, each linking component can, as a variant, be a rivet.

According to this second preferred embodiment, when two rolling components guide the movement of the pendulum body relative to the support, each rolling component cooperates with a first raceway dedicated to this rolling component and with two second raceways dedicated to this rolling component.

According to this second preferred embodiment, each rolling component can then comprise, in axial succession:

a portion disposed in an opening of the first pendulum mass and cooperating with the second raceway formed by a portion of the profile of this opening;

a portion disposed in an opening of the support and cooperating with the first raceway formed by a portion of the profile of this opening; and a portion disposed in an opening of the second pendulum mass and cooperating with the second raceway formed by a portion of the profile of this opening.

The pendulum damping device also may not be a device with a single support, comprising, for example, two supports axially offset and secured together, with the pendulum body comprising at least one pendulum mass axially disposed between the two supports. The pendulum body comprises, for example, a plurality of pendulum masses secured together. All these pendulum masses of the same pendulum body can be axially disposed between the two supports. As a variant, only some pendulum masses of the pendulum body axially extend between the two supports, with other pendulum masses of this pendulum body axially extending beyond either one of the supports. The rolling component can then cooperate with two first raceways, each one being integral with a respective support, and with a single second raceway integral with the pendulum mass. Each first raceway is defined, for example, by a portion of the profile of an opening provided in a respective support and the second raceway is defined by a portion of the profile of an opening arranged in the pendulum mass.

Throughout the above, each rolling component can cooperate with the one or more raceway(s) integral with the support and with the one or more raceway(s) integral with the pendulum body solely via its outer surface. Each rolling component is, for example, a roller made of steel. The roller can be hollow or solid. This roller may have only one diameter along its entire longitudinal axis. As a variant, this roller has, longitudinally speaking, portions with a different diameter, for example, a central portion with a first diameter surrounded, longitudinally speaking, by two portions of a second diameter, which is less than the first diameter. As a further variant, the roller has portions that follow each other that have a different diameter and that monotonously vary, longitudinally speaking. The device comprises, for example, a number of pendulum bodies ranging between two and eight, in particular three, four, five or six pendulum bodies. Each of these pendulum bodies can filter, when it moves relative to the support, the first predefined order value and the second predefined order value.

All these pendulum bodies can follow each other circumferentially. The device thus can comprise a plurality of planes perpendicular to the axis of rotation, with all the pendulum bodies being arranged in each of said planes.

Throughout the above, the support can be produced as one piece, being entirely made of metal, for example.

Throughout the above, in the pendulum damping device, all the first raceways integral with the support can have exactly the same form, if necessary with an inversion, as mentioned above, between themselves and/or all the second raceways integral with the pendulum body can have exactly the same form between themselves.

Also throughout the above, two circumferentially adjacent pendulum bodies can be connected together by at least one resilient return component, for example, according to the teaching of applications EP 3153741, EP 3380750, EP 3190310. The teaching of these patent applications is incorporated with reference to the present application with respect to the connection between the circumferentially adjacent pendulum bodies. As a variant, two neighboring circumferentially adjacent pendulum bodies can be connected by a connection involving axial friction, for example, according to the teaching of application EP 3332147. The teaching of this patent application is incorporated with reference to the present application with respect to the connection between the circumferentially adjacent pendulum bodies.

A further aim of the invention, according to another one of the aspects thereof, is a component for a motor vehicle transmission system, the component particularly being a dual mass flywheel, a hydrodynamic torque converter, a flywheel secured to the crankshaft, a wet or dry dual clutch, a single wet clutch, a hybrid powertrain component, or a friction clutch disk, comprising a pendulum damping device as defined above.

The support of the pendulum damping device then can be one from among:
  a web of the component;
  a washer for guiding the component;
  a washer for phasing the component; or
  a support separate from said web, said guiding washer and said phasing washer.

In the case whereby the device is integrated into a flywheel secured to the crankshaft, the support can be secured to this flywheel.

The invention will be better understood from reading the following description of non-limiting examples and with reference to the appended drawings, in which.

Figure 1:
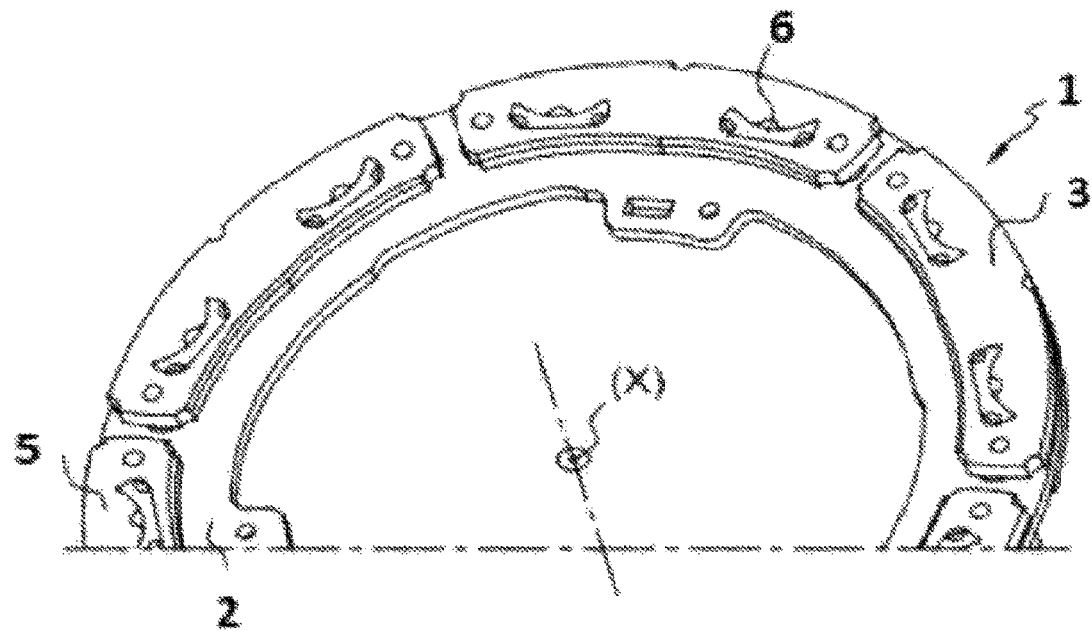
FIG. 1 shows a pendulum damping device to which the invention can be applied.

FIG. 1 shows an example of a pendulum damping device 1. The device 1 is particularly able to equip a motor vehicle transmission system, with it being integrated, for example, into a component, not shown, of such a transmission system, with this component being, for example, a dual mass flywheel, a hydrodynamic torque converter, a flywheel secured to the crankshaft, a wet or dry dual clutch, a single wet clutch, a hybrid powertrain component, or a friction clutch disk.

This component can form part of a powertrain of a motor vehicle, said vehicle comprising a combustion engine, in particular with three or four cylinders.

In FIG. 1, the device 1 is at rest, i.e. it does not filter the torsion oscillations transmitted by the propulsion chain due to acyclic behavior of the combustion engine.

In a known manner, such a component can comprise a torsion damping system having at least one inlet element, at least one outlet element, and resilient return components with a circumferential action that are inserted between said inlet and outlet elements. Within the meaning of the present application, the terms "inlet" and "outlet" are defined relative to the direction of transmission of the torque from the combustion engine of the vehicle to the wheels of said vehicle.

In the considered example, the device 1 comprises:
  a support 2 that is able to rotate about an axis X; and
  a plurality of pendulum bodies 3 that can move relative to the support 2.

In the example of FIG. 1, six pendulum bodies 3 are provided, evenly distributed over the periphery of the axis X.

The support 2 of the damping device 1 can be made up of:
  an inlet element of the torsion damping system;
  an outlet element; or
  an intermediate phasing element disposed between two series of springs of the damping system; or
  an element rotationally linked to one of the aforementioned elements and separate therefrom, which is then, for example, a support specific to the device 1.

The support 2 is a guiding washer or a phasing washer in particular.

The support 2 also can be of another type, such as a flange.

In the considered example, the support 2 has the general shape of a ring comprising two opposite sides 4, which in this case are flat faces.

As can be seen from FIG. 1, each pendulum body 3 comprises, in the considered example:
  two pendulum masses 5, with each pendulum mass 5 axially extending opposite a side 4 of the support 2; and
  two linking components 6 securing the two pendulum masses 5.

The linking components 6, also called "spacers", are angularly offset in the considered example. In a variant, not shown, a single linking component can be used to secure the two pendulum masses.

In the example of FIG. 1, each end of a linking component 6 is forced-fitted into an opening provided in one of the pendulum masses 5 of the pendulum body 3, so as to secure these two pendulum masses 5 together.

Each linking component 6 partly extends into an aperture 9 provided in the support. In the considered example, the aperture 9 defines an empty space inside the support, with this aperture being defined by a closed profile 10.

Figure 2:
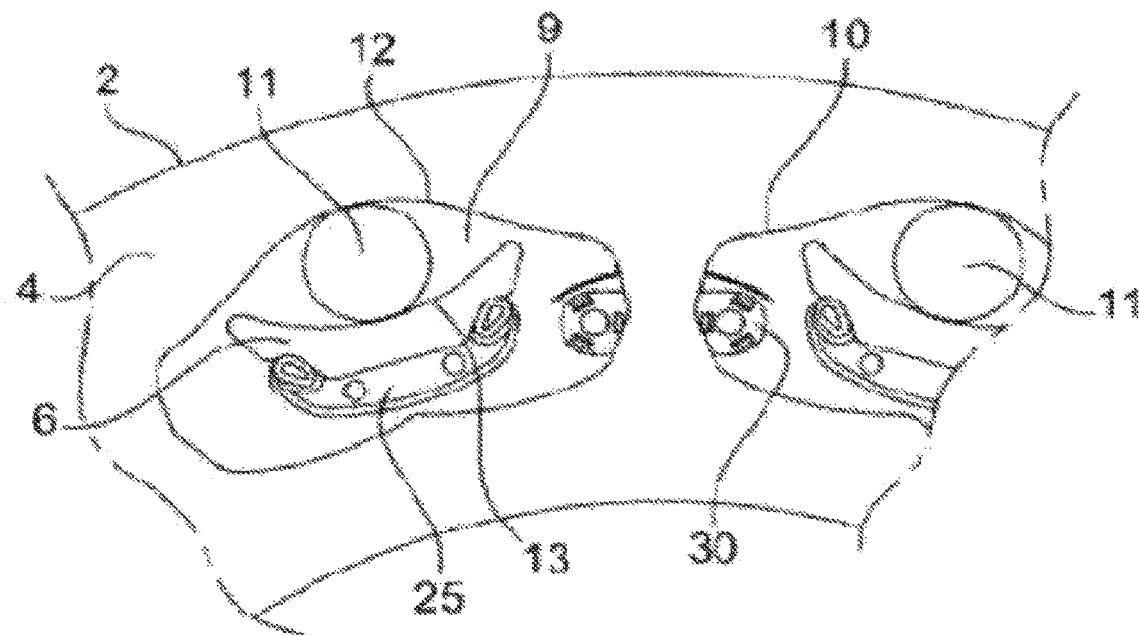
FIG. 2 shows details of FIG. 1.

The device 1 also comprises, in the considered example, rolling components 11 guiding the movement of the pendulum bodies 3 relative to the support 2. The rolling components 11 in this case are rollers, as will be seen hereafter. In the example of FIGS. 1 and 2, each roller maintains a substantially constant diameter over its entire length.

As can be seen in FIG. 2, the device 1 can also comprise stop damping components 25 able to simultaneously come into contact with a linking component 6 and with the support 2 in certain relative positions of the support 2 and of the pendulum masses 3, such as the coming into abutment that occurs at the end of a movement from the rest position in order to filter a torsion oscillation or when the pendulum body 3 falls radially. Each stop damping component 25 in this case is integral with a pendulum body 3, being mounted on each pendulum body 3 and disposed so as to be radially inserted between a linking component 6 of this pendulum body 3 and the profile 10 of the opening 9.

In the described example, the movement of each pendulum body 3 relative to the support 2 is guided by two rolling components 11, with each of them cooperating, in the example of FIGS. 1 and 2, with one of the linking components 6 of the pendulum body 3.

As can be seen in FIG. 2, in which each pendulum body 3 is at rest, each rolling component 11 cooperates by rolling with a single first raceway 12 integral with the support 2, and with a single second raceway 13 integral with the pendulum body 3 in order to guide the movement of the pendulum body translationally about a dummy axis parallel to the axis of rotation X of the support 2 and rotationally, in this case about the center of gravity of said pendulum body 3.

In the considered example, each second raceway 13 is formed by a portion of the radially external edge of a linking component 6. In one example, not shown, a single linking component 6 is provided for the entire pendulum body 3, and a portion of its radially external edge defines a second raceway 13, whereas another portion of its radially external edge defines another second raceway 13.

Each first raceway 12 is defined by a portion of the profile of an aperture 9 provided in the support 2 and accommodating one of the linking components 6.

Each first raceway 12 is thus radially disposed facing a second raceway 13, so that the same rolling surface of a rolling component 11 alternately rolls over the first raceway 12 and over the second raceway 13. The rolling surface of the rolling component in this case is a cylinder with a constant radius.

FIG. 2 also shows that insertion parts 30, also called "pads", can be provided. One or more pads 30 are, for example, fixedly supported by each pendulum mass 5.

The movement of each pendulum body 3 relative to the support 2 occurs from the rest position of FIGS. 1 and 2 toward stop positions, that circumferentially surround the rest position. The curvilinear distance measured along a first 12 or second 13 raceway between the two positions occupied by the rolling component 11 in these respective stop positions defines the length of said raceway, with these stop positions together defining the whole of said raceway.

An embodiment of the invention will now be described with reference to FIG. 4 that allows the pendulum body 3 to move relative to the support 2 as a combined movement, as defined above.

In the considered example, each second raceway 13 provided by a linking component 6 is an arc of a circle. The value of the radius is constant, for example, from one second raceway 13 to the next for the same pendulum body, with this value being, for example, of the order of a few cm, for example, 35 mm for each second raceway 13.

Still in the considered example, each first raceway 12 has a form different from an arc of a circle. Each first raceway 12 has a rest point P corresponding to the contact point of the rolling component 11 and of this first raceway 12 when the pendulum body 3 is in the rest position, and this rest point defines, in the considered example, a discontinuity in curvature for the first raceway 12.

In the considered example, each rest point P separates, for a first raceway 12, a proximal portion 30 and a distal portion 31. Within the meaning of the present application, "proximal portion" refers to the portion of the first raceway 12 that is closest to the other first raceway 12 associated with the same pendulum body 3, and "distal portion" refers to the portion of the first raceway 12 that is furthest apart from the other first raceway 12 associated with the same pendulum body 3.

Still in the considered example, the form of the proximal portion of the two first raceways 12 associated with the same pendulum body is the same between them, and their distal portion is the same between them.

Figure 4:
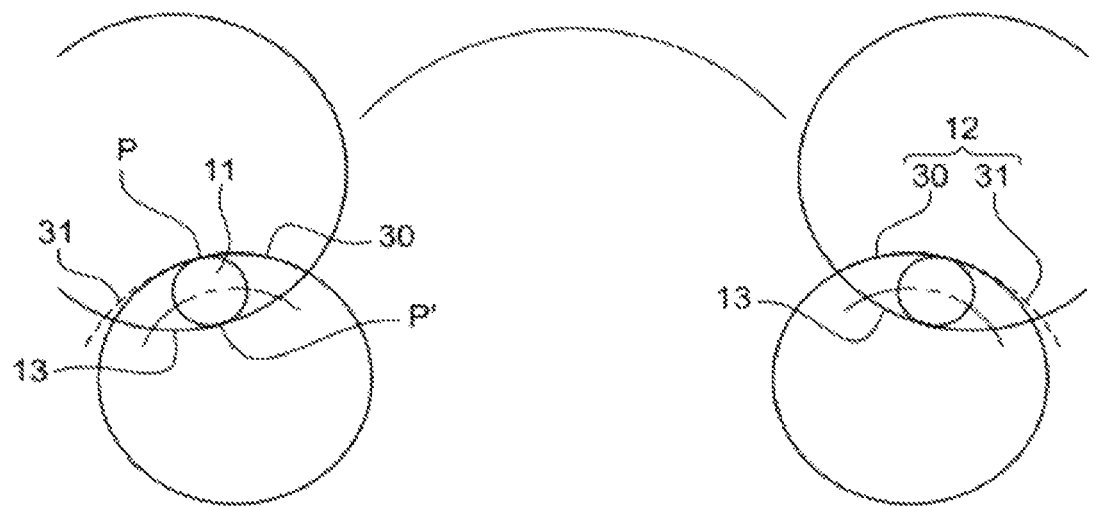
FIG. 4 is a view of the raceways according to one embodiment of the invention.

In the example of FIG. 4, each proximal portion 30 is a circle, having, for example, the same radius for all the first raceways 12. This same radius value is, in the considered example, less than the radius value of the second raceways 13, being equal, for example, to 25 mm in this example. Each distal portion 31 has, in this case, a form different from an arc of a circle, for example, a form corresponding to a constantly increasing curvature, such as an Archimedean spiral.

Thus, it can be seen that the two first raceways 12 associated with the same pendulum body 3 are symmetrical relative to a plane P that forms a plane of symmetry for the pendulum body 3.

Figure 5:
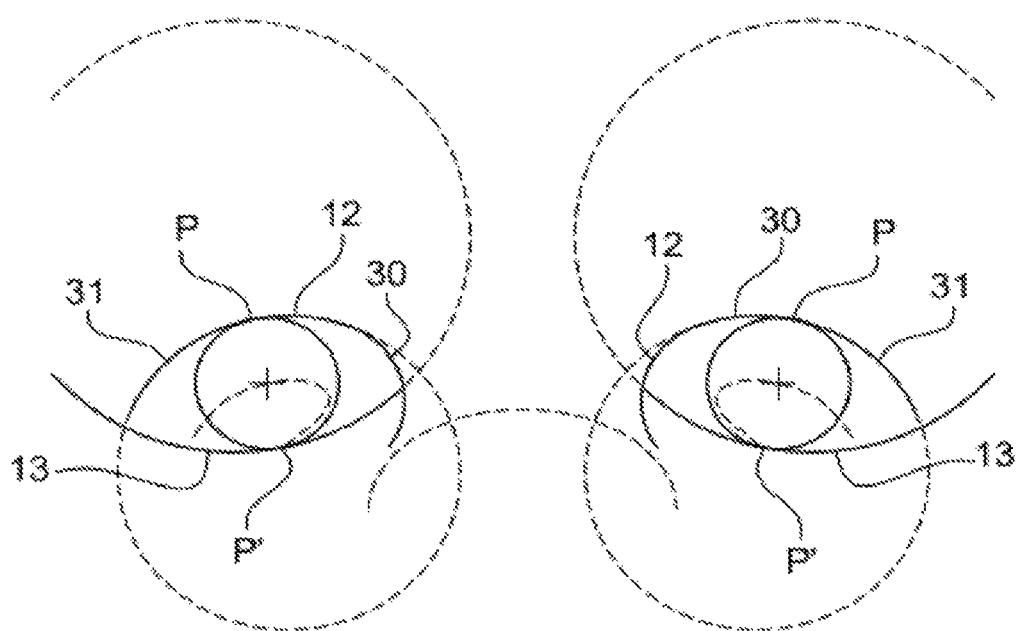
FIG. 5 is a view of the raceways according to a variant of the embodiment of FIG. 4.

In the variant of FIG. 5, each distal portion 31 is a circle, whereas each proximal portion 30 has a form different from an arc of a circle.

The invention is not limited to the examples that have been described above.

Figure 3:
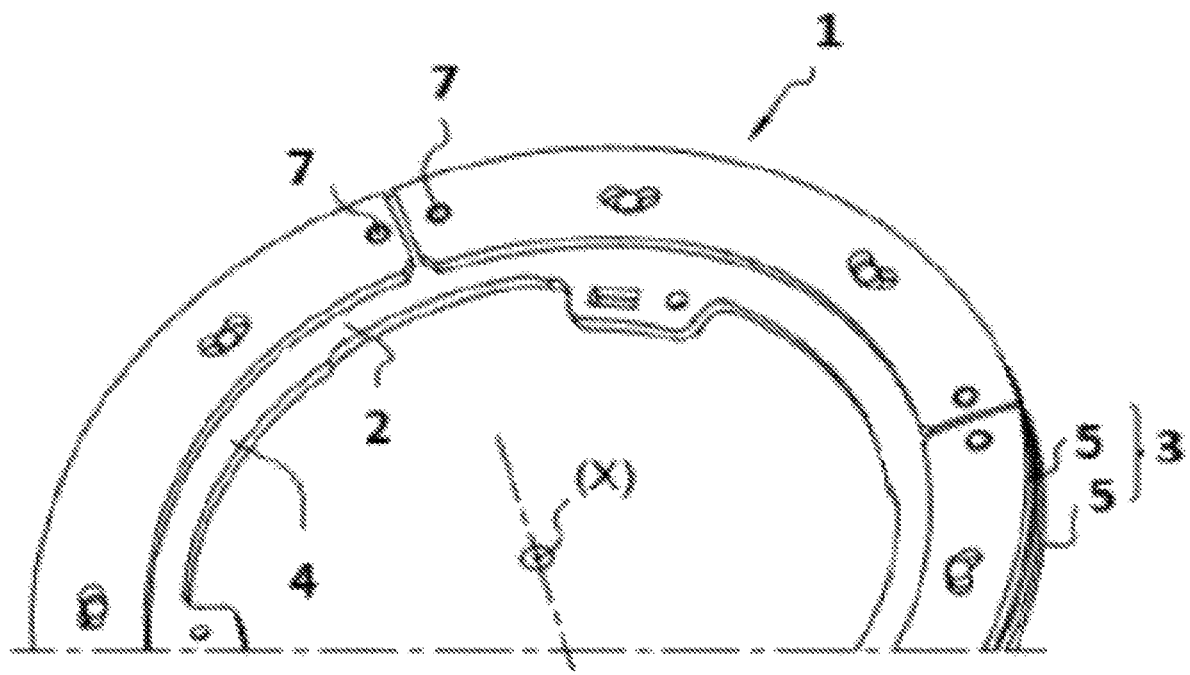
FIG. 3 shows another pendulum damping device to which the invention can be applied.

In particular, the invention can be implemented in a pendulum damping device 1 as shown in FIG. 3. In this case, the linking components between two pendulum masses 5 of a pendulum body 3 are rivets 7. The second raceways 13 are then formed by portions of the opening profile provided in pendulum masses 5.

In yet other variants, it is not the second raceways 13 that are arcs of a circle and the first raceways 12 that have a form other than an arc of a circle, but the opposite is the case. In other words, each first raceway 12 is an arc of a circle and each second raceway 13 has a form different from an arc of a circle. Each second raceway has a rest point P', corresponding to the contact point of the rolling component 11 on this second raceway 13 when the pendulum body is in the rest position, and this rest point P' defines a discontinuity in form for the second raceway 13. Similar to the above description, each second raceway can comprise a proximal portion and a portion separated by the rest point P', and:

each proximal portion is a circle and each distal portion has a form different from an arc of a circle, for example, a form corresponding to a constantly increasing curvature; or each distal portion is a circle whereas each proximal portion has a form different from an arc of a circle, for example, a form corresponding to a constantly increasing curvature.

The invention claimed is:

1. A pendulum damping device, comprising:
a support free to rotate about an axis;
at least one pendulum body that is able to move relative to the support; and
at least one rolling component guiding the movement of the pendulum body relative to the support, the rolling component cooperating with at least one first raceway integral with the support and with at least one second raceway integral with the pendulum body,
wherein one from among the first raceway and the second raceway defines an arc of a circle having a constant radius and the other one from among the first raceway and the second raceway along which the rolling component rolls defines a form other than an arc of a circle, and
wherein an entire edge of the first or second raceway, along which the rolling component rolls while the pendulum body moves with respect to the support, defines the arc of the circle having the constant radius,
wherein the first raceway has a rest point, the rest point corresponding to a contact point between the rolling component and this first raceway when the pendulum body is at rest, and the first raceway having a discontinuity in curvature, at a passage of this rest point, and
wherein the first raceway defines an arc of a circle on one side of the rest point and defines a form different from an arc of a circle on an other side of the rest point.

2. The device as claimed in claim 1, the second raceway defining an arc of a circle and the first raceway defining a form other than an arc of a circle.

3. The device as claimed in claim 2, the first raceway having a rest point, corresponding to the contact point between the rolling component and this first raceway when the pendulum body is at rest, and the first raceway having a discontinuity in curvature, at the passage of this rest point.

4. The device as claimed in claim 2, the support of the pendulum damping device being unique and the pendulum body comprising two pendulum masses respectively axially disposed on one side of the support, with these two pendulum masses being secured together by at least one linking component,
the rolling component rolling on a single first raceway and on:
a single second raceway defined by the linking component; or
two second raceways respectively defined by one of the pendulum masses of the pendulum body.

5. The device as claimed in claim 1, the first raceway defining an arc of a circle on one side of the rest point and defining a form having a constantly variable curvature on the other side of the rest point.

6. The device as claimed in claim 5, comprising two rolling components guiding the movement of the pendulum body relative to the support, each rolling component rolling on a first raceway integral with the support and specific to said rolling component and on a second raceway integral with the pendulum body and specific to said rolling component,
with one of these first raceways defining an arc of a circle from the rest point of this first raceway by moving in the trigonometric direction and defining a form different from an arc of a circle from the rest point by moving in the non-trigonometric direction; and
the other one of these first raceways defining an arc of a circle from the rest point of this first raceway by moving in the non-trigonometric direction and defining a form different from an arc of a circle from the rest point by moving in the trigonometric direction.

7. The device as claimed in claim 5, the rolling component being able to move along the first raceway between two end positions disposed on either side of the rest point, and the rest point not being disposed at the halfway point of the length of the first raceway, measured between these two end positions.

8. The device as claimed in claim 1, comprising two rolling components guiding the movement of the pendulum body relative to the support, each rolling component rolling on a first raceway integral with the support and specific to said rolling component and on a second raceway integral with the pendulum body and specific to said rolling component,
with one of these first raceways defining an arc of a circle from the rest point of this first raceway by moving in the trigonometric direction and defining a form different from an arc of a circle from the rest point by moving in the non-trigonometric direction; and
the other one of these first raceways defining an arc of a circle from the rest point of this first raceway by moving in the non-trigonometric direction and defining a form different from an arc of a circle from the rest point by moving in the trigonometric direction.

9. The device as claimed in claim 8, the rolling component being able to move along the first raceway between two end positions disposed on either side of the rest point, and the rest point not being disposed at the halfway point of the length of the first raceway, measured between these two end positions.

10. The device as claimed in claim 1, the rolling component being able to move along the first raceway between two end positions disposed on either side of the rest point, and the rest point not being disposed at the halfway point of the length of the first raceway, measured between these two end positions.

11. The device as claimed in claim 1, the support of the pendulum damping device being unique and the pendulum body comprising two pendulum masses respectively axially disposed on one side of the support, with these two pendulum masses being secured together by at least one linking component,
the rolling component rolling on a single first raceway and on:
a single second raceway defined by the linking component; or
two second raceways respectively defined by one of the pendulum masses of the pendulum body.

12. A component for a motor vehicle transmission system, the component configured to comprise the pendulum damping device as claimed in claim 1.

13. The device as claimed in claim 1, the rolling component being able to move along the first raceway between two end positions disposed on either side of the rest point, and the rest point not being disposed at the halfway point of the length of the first raceway, measured between these two end positions.

14. The device as claimed in claim 1, the support of the pendulum damping device being unique and the pendulum body comprising two pendulum masses respectively axially disposed on one side of the support, with these two pendulum masses being secured together by at least one linking component, the rolling component rolling on a single first raceway and on:

a single second raceway defined by the linking component; or two second raceways respectively defined by one of the pendulum masses of the pendulum body.

15. The device as claimed in claim 1, the support of the pendulum damping device being unique and the pendulum body comprising two pendulum masses respectively axially disposed on one side of the support, with these two pendulum masses being secured together by at least one linking component, the rolling component rolling on a single first raceway and on:

a single second raceway defined by the linking component; or two second raceways respectively defined by one of the pendulum masses of the pendulum body.

\* \* \* \* \*